July 29, 1969  TADAO KOHASHI  3,458,700
ENERGY-SENSITIVE COMPOSITE ELEMENTS
Original Filed April 6, 1964  3 Sheets-Sheet 1
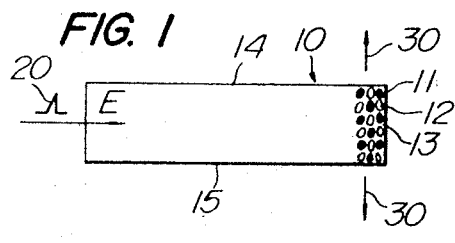
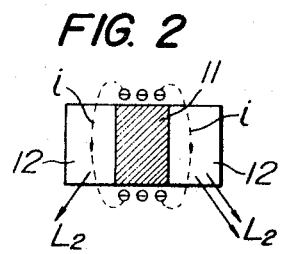
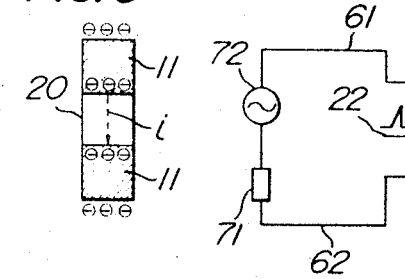
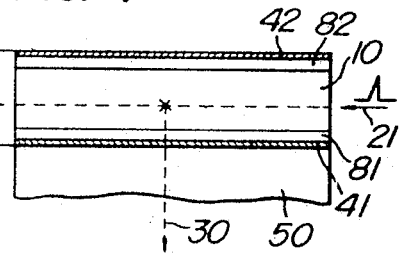
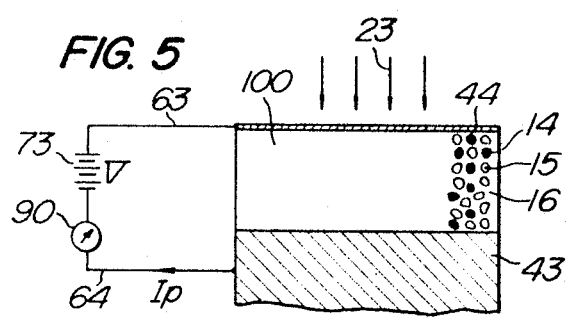
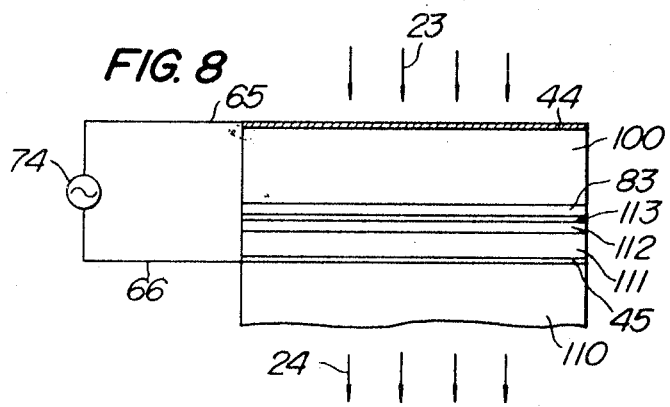
Inventor
Tadao Kohashi
By Stevens, Davis, Miller & Mosher
ATTORNEYS

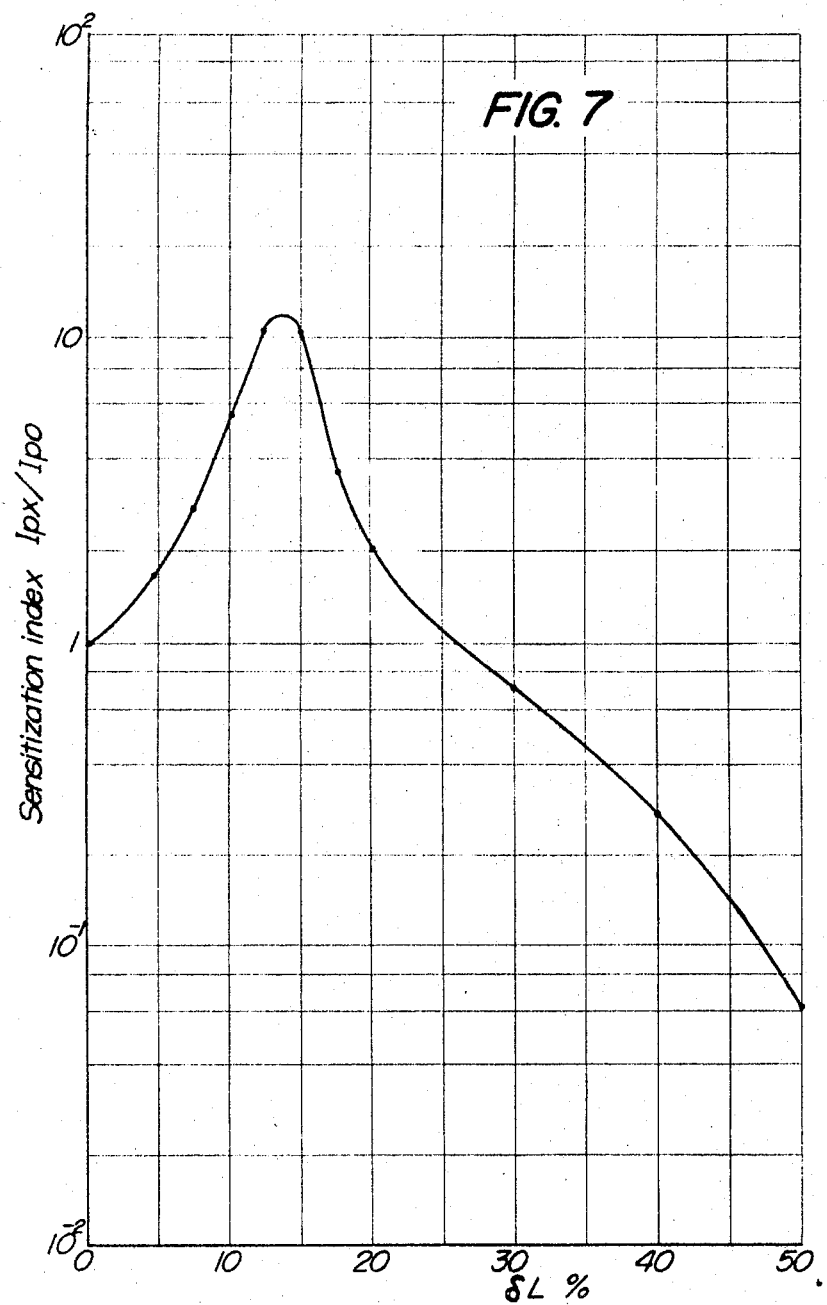

United States Patent Office 3,458,700
Patented July 29, 1969

3,458,700
ENERGY-SENSITIVE COMPOSITE ELEMENTS
Tadao Kohashi, Yokohama, Japan, assignor to Matsushita Electric Industrial Co., Ltd., Kadoma-shi, Osaka, Japan
Continuation of application Ser. No. 357,539, Apr. 6, 1964. This application Nov. 6, 1967, Ser. No. 681,030
Claims priority, application Japan, Apr. 17, 1963, 38/20,446
Int. Cl. G01n 21/16, 21/38
U.S. Cl. 250—71                                                    16 Claims This application is a continuation of application Ser. No. 357,539, filed Apr. 6, 1964.

This invention relates to energy-sensitive elements for converting input energies into signals or other energies associated with the input energies.

An object of the present invention is to provide an energy-sensitive composite element consisting of a mixture of an energy-converting elementary material responsive to an input energy for effecting energy-conversion, and an energy-sensitive elementary material responsive to the converted energy for producing a signal or other output energy associated with the converted energy.

Another object of the invention is to provide an energy-sensitive composite element of the kind specified wherein at least one of the elementary materials, i.e., the energy-sensitive elementary material, is transparent to the input energy or transmissive of the same, and the converted energy produced by the input energy in the energy-converting elementary material excites the energy-sensitive elementary material to produce a signal or other output energy associated with the input energy.

Another object of the invention is to provide an energy-sensitive composite element of the kind specified wherein the energy-sensitive elementary material is also sensitive to the input energy before conversion thereof.

A further object of the present invention is to provide an energy-sensitive composite element of the kind specified, which is simple in construction and effective in operation.

There are other objects and particularities of the present invention, which will be made obvious from the following detailed description of the invention, with reference to the accompanying drawings, in which;

FIG. 1 is a somewhat diagrammatic representation of one embodiment of the present invention;

FIGS. 2 and 3 are diagrams showing idealistic operation of the energy-sensitive composite element shown in FIG. 1;

FIGS. 4 and 5 show respectively two other embodiments of the invention, somewhat diagrammatically;

FIG. 7 is a curve diagram showing results of experiments on the energy-sensitive composite element shown in FIG. 5; and FIG. 8 is a somewhat diagrammatic representation of another embodiment of the invention.

Figure 6:
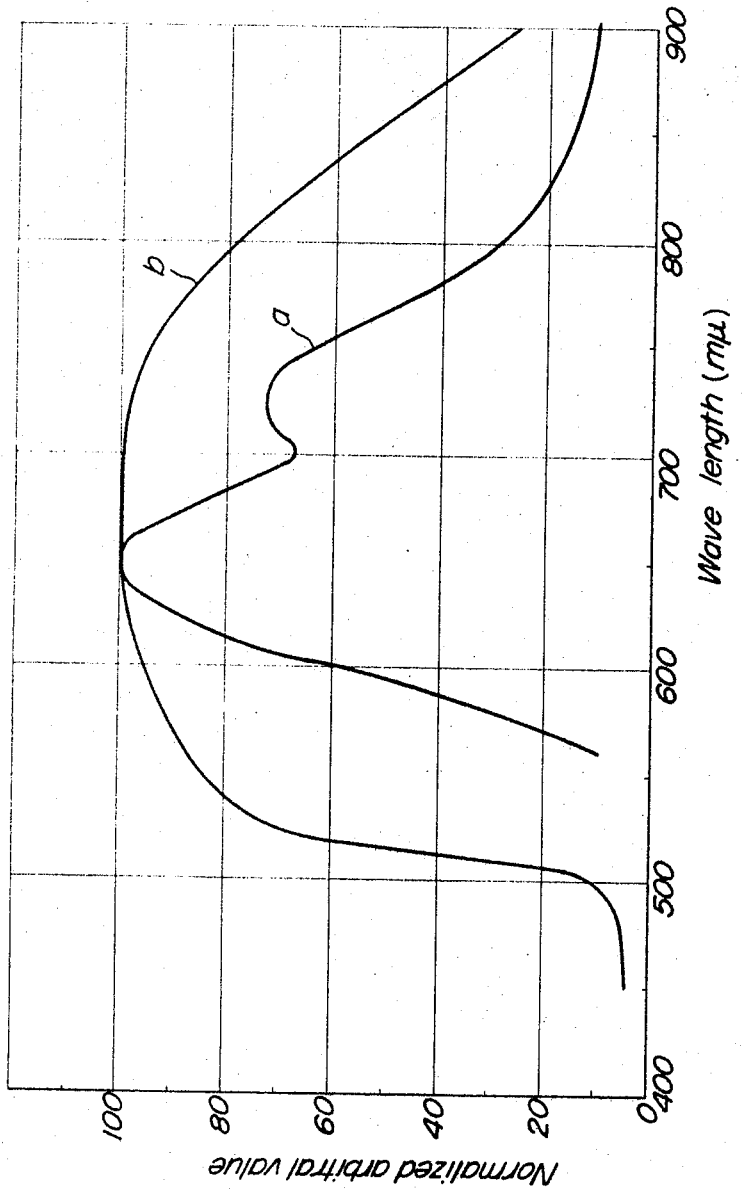
FIG. 6 is a curve diagram showing the spectroscopic characteristics of the elementary materials used in the embodiment shown in FIG. 5.

Throughout the present specification and claims, the term "energy" is used to indicate every kind of energy, visible or invisible, including light, X-ray, $\gamma$-ray, $\alpha$-ray, and other radiation energies, electron beam, electric energy such as electromagnetic energy, etc., magnetic energy such as magnetic lines, etc., mechanical energy such as elastic wave energy, etc., and all other forms of energies, irrespective of their natures, whether physical or chemical.

Further terminological conventions are as follows:
"Input Energy" is the energy applied to the energy-sensitive element of the invention for obtaining therefrom a signal or other output energy.

"Signal" means every sort of changes, whether in energy-form or not, such as electric impedance for example, produced as a result of application of the input energy.

"Energy Conversion" means conversion of the input energy into another energy of different nature, such as for example, conversion of mechanical energy, such as elastic energy, into electric energy, and also conversion of X-ray, ultra-violet ray, or the like into visible light, that is, wavelength or frequency conversion.

"Converted Energy" is the energy produced by the energy conversion.

In an energy-sensitive element, an electrical impedance may operate to produce a signal or other converted energy, only when electric energy is applied to the impedance, and the energy-sensitive element is considered including such an auxiliary means.

Many energy-sensitive elements are well-known that are responsive to input energies for obtaining associated signals or converted energies. They may be classified into two cases according to the natures of the energy-sensitive elements.

The first case is that in which it is not possible to obtain signal or converted energy from the input energy by means of a single element. In this case, an energy-converting element responsive to the input energy must be provided in association with, but separately from the energy-sensitive element that is responsive to the energy converted in association with the input energy. The second case is that in which the energy-sensitive element itself responds directly to the input energy for obtaining the desired signal or converted energy, but is extremely bad in performance. In such a case, an energy-converting element must be provided in association with, but independently from the energy-sensitive element, whereby the input energy excites both of the elements, the signal or converted energy produced by the energy-converting element being superposed on the input energy to excite the energy-sensitive element. This is the case of increase in sensitivity.

An example of the former case is that in which the energy-converting element is a piezo-electric element, while the energy-sensitive element is an electro-luminescent element, the two elements being bonded together in layer form, or electrically connected together by a conductor to form a closed circuit. The input energy is mechanical in the form of an elastic wave to excite the piezo element for effecting energy conversion to obtain a piezoelectric voltage, that is, electrical energy, which excites the electro-luminescent element to produce the desired signal or converted energy in the form of visible light. The latter case is exemplified by X-ray sensitizer paper, in which the X-ray sensitive film itself as the energy-sensitive element responds to X-ray energy to make a latent image as the signal. In this case, however, a simple light-sensitive film, being extremely low in sensitivity, cannot respond effectively because of high transparency of the film to X-ray. On the contrary, in case that input energy is visible light, it is effectively absorbed, resulting in extremely high sensitivity.

When a fluorescent film sensitive to the input energy to produce visible light as the converted energy is adhered to an X-ray sensitive film as an energy-converting element, and an X-ray sensitive film that is also sensitive to visible light, the converted energy, is used as the energy-sensitive element, this film can respond to the X-ray energy as well as to the visible light energy, to obtain high sensitivity.

However, in any of the above-described well-known constructions, the energy-sensitive element and the energy-converting element are arranged separately but in association with each other. Consequently, their fabrications are considerably difficult in many cases. Particularly in the latter case, the utilizable solid angle or respondency of the energy-sensitive element to the converted energy produced by the energy-converting element is limited to $2\pi$, with low factor of utiilzation of the converted energy or signal, and consequently, its performance and sensitivity are limited naturally, with complex structure of strict conditions, resulting in large size construction.

According to the present invention, at least one of the energy-sensitive elementary material and the energy-converting elementary material is in the form of a colloid, particle or powder, and the two materials are in a state of mixture to form the energy-sensitive composite element, which single or unity element accomplishes the purpose desired, and in which at least one of the solid angle of response of the energy-sensitive elementary material and the solid angle of utilization of converted energy produced in the energy-converting elementary material can be $4\pi$, as the highest possible value. In addition, this new energy-sensitive composite element is simple in construction and is effective in operation with improved performance.

Referring now to FIG. 1 showing one embodiment of the invention, in a longitudinal section, for obtaining a signal or visible light as the converted energy from the input mechanical energy of an elastic wave, the energy-converting elementary material is a piezo-electric material, such as lead zircon-titanate, $Pb(Zr \cdot Ti)O_3$, for converting the input elastic wave into electric energy, while the energy-sensitive elementary material is an electro-luminescent material, such as zinc sulfide activated with copper and chlorine for example, for producing a brightness signal or visible light energy in response to electric energy applied thereto. Thus, the energy-sensitive composite element 10 is composed of the piezo-electric elementary material 11 in powder form and the electro-luminescent elementary material 12 in powder form mixed together, and bonded together by adhesive material 13, such as glass-enamel or other transparent and dielectric adhesive material. At least, the electro-luminescent powder 12 and the adhesive powder 13 should be transparent to or transmissive of the elastic wave 20, the input energy. In order to impart piezo-electric property to the piezo-electric powder 11, the composite element 10 is maintained at a temperature above the Curie point of the powder 11, and is polarized in the direction of thickness by application of D.C. electric field by means of suitable auxiliary electrodes disposed on the opposite upper and lower faces 14 and 15 of the composite element 10. Thus, the piezo-electric powders 11 are all polarized in the direction of thickness, and piezo-electric effect is imparted thereto.

If, under the above-condition, elastic wave 20 is applied to the composite element 10 laterally thereto, that is, in the direction of arrow E, the elastic wave propagates itself laterally, whereby the piezo-electric particles 11 are respectively compressed laterally and elongated in the direction of polarization. As a result, the piezo-electric particles 11 are respectively polarized in the direction of thickness by virtue of the piezo-electric effect to produce piezo-electric voltage. Thus, the input energy is converted into electric energy. The electro-luminescent particles 12 are in commingled relation with the piezo-electric particles 11, and consequently, the converted electric energy from the piezo-electric particles 11 finds its way to flow in the neighbouring electro-luminescent particles 12 as shown in FIGS. 2 and 3, in which figures, the dielectric bonding material 13 is omitted, since it is negligible in effect. In FIG. 2, the neighbouring particles 11 and 12 lie in a plane perpendicular to the direction of polarization, while in FIG. 3, the neighbouring particles 11 and 12 lie in a plane parallel to the direction of polarization. In either case, electric energy produced by a piezo-electric particle 11 generates plus and minus polarized charges, i.e., voltage in the direction of polarization, which generate current $i$ flowing through the electro-luminescent particles 12 and are consumed therein. The electro-luminescent particles 12 thus excited produce visible light energy $L_2$.

As is obvious even from FIGS. 2 and 3, the converted electrical energy of a particle 11 is imparted to neighbouring particles 12 with a solid angle $4\pi$ around the particle 11, to excite the particles 12 for producing visible light. Thus, the input mechanical energy is effectively converted into the corresponding visible light energy, and the visible light signal shifts along with propagation of elastic wave 20 in FIG. 1.

It has thus been disclosed that the energy-sensitive composite element 10 shown in FIG. 1 can provide desired visible light signal from the input elastic-wave energy, without the use of any other auxiliary or associated device.

The above-described embodiment provides an important principle for a scanning system for an electro-luminescent layer, and enables the bringing of a solid display device into practice.

Referring to FIG. 4, in which a solid indicating device is shown in longitudinal cross-section, an energy-sensitive composite element 10, as shown in FIG. 1, is sandwiched between a pair of opposite electrodes 41 and 42 for supplying auxiliary electric energy to the composite element. The device is mounted on a supporter plate 50 of transparent glass. The electrode 41 is made of tin oxide or the like, and is transparent to the visible light signal 30, while the electrode 42 is made of aluminum or like material capable of reflecting visible light towards the opposite electrode 41. The electrode 42 may be in the form of a metallic plate or may be formed by vaporization-deposition process, and also may be treated to improve the brightness of signal 30.

Input elastic impact waves 21 and 22 are applied to the composite element 10 from the opposite ends thereof, simultaneously, and two visible light signals produced thereby travel towards the centre of composite element 10. Thus, at the point where the two elastic waves 21 and 22 collide, the electric energy produced thereby is doubled to provide visible light signal stronger than those produced at other points. Consequently, if the input waves 21 and 22 are linear or ribbon-like elastic impact waves extending vertically to the directions of travel, and parallel to each other, the output signal 30 is also linear or ribbon-like with high strength. If the two elastic waves are not parallel to each other, a strong visible signal is produced at the point of intersection of the two waves, which point shifts with time to effect bright-point scanning. Consequently, if the times of application of impact waves are correlated suitably and changed periodically, two-dimensional bright-point scanning can be effected.

In order to keep the electric energy applied to electro-luminescent particles 12 at positions other than the place of collision or point of intersection of two elastic waves 21 and 22 below the critical luminescent state for obtaining a high white-to-black ratio between the signal light 30 and lights at other places, an auxiliary electrode source 71 is provided and connected across the electrodes 41 and 42 through conductors 61 and 62. In this circuit, an electric signal source 72 is connected to modulate a brightness signal, such as video electric signal 30, or the electric energy consumed at point 30 is modulated by the above-mentioned signal source 72, and the above-described two-dimensional scanning is effected, and thereby a solid indicating device is obtained.

However, it is not desirable to arrange the electrodes 41 and 42 directly on the opposite surfaces of the composite element 10, because the converted electric energy in piezo-electric particles in contact with the electrodes 41 and 42 diffuses into the electrodes 41 and 42, resulting in enlargement of the brightness signal 30, or increase in brightness of the whole surface of the composite element 10 except point 30, with lowering of the white-to-black ratio. In addition, if the electric impedance of the circuit seen from the electrodes 41 and 42 to electric source 71 and signal source 72 is low, most of the electric energy is consumed in the external circuit, but not in the composite element 10. This means that the respondency of electroluminescent particles 12 in contact with or adjacent to the electrodes 41 and 42 is lowered, with a corresponding decrease in the strength of required signal 30.

Such a default may be eliminated by providing the outside surfaces of the composite element 10 with suitable elements or means for reflecting the signal or converted energy or preventing escap of the same, whereby the signal or converted energy is prevented from escaping out of the composite element 10. Referring again to FIG. 4, for preventing such escape of electric energy, dielectric elements of layer forms 81 and 82 of high impedance are inserted between the composite element 10 and the electrodes 41 and 42, respectively. The element 82 is transparent to light for utilizing the reflective nature of electrode 42, and the element 81 is also transparent to light for drawing out the visible light signal 30. These elements 81 and 82 may be formed of glass-enamel, plastics, or the like.

According to the present inevntion, the input energy may be X-ray, γ-ray, or other radiation energy, and in such a case, the energy-sensitive elementary material may be photo-conductive material, such as cadmium sulfide activated with copper and chlorine, or the like. However, X-ray and like radiation energy are extremely high in permeability, in general, and effective response thereto is difficult to obtain, resulting in low sensitivity of the device. On the other hand, the above-mentioned material is effectively sensitive to light energy, with high photo-conductive sensitivity.

However, cadmium sulfide photo-conductive material has extremely low permeability to light energy, the effective exitation thickness being said to be 10–20$\mu$. Consequently, when a photo-conductive material is used as the energy-sensitive element, and the change in its impedance in the direction of thickness and the change control of electric energy through the impedance change are the desired signal or converted energy responsive to the input energy, even if a fluorescent film for radiation ray is provided on the surface of photo-conductive layer as the energy converting element as in X-ray sensitizer paper, the light energy converted by radiation energy is absorbed in the surface portion but cannot excite the inner portion of the layer of photo-conductive material, so that the change in impedance in the direction of thickness of the photo-conductive layer is not substantially improved.

Referring to FIG. 5 showing a photo-conductive composite element embodying the present invention in longitudinal section and auxiliary source of electric energy diagrammatically, the comopsite element 100 is composed of powdered fluorescent material 14' for X-ray use as the energy-converting elementary material, powdered photo-conductive material 15' as the energy-sensitive elementary material, and adhesive material 16 for bonding together the elementary materials. The powdered fluorescent material 14' converts the input X-ray energy 23 into light energy. This is frequency conversion. In the embodiment shown, the X-ray fluorescent material 14' is required to be effectively sentitive, and is formed of solid particles of CdS-ZnS activated with Ag, its spectroscopic energy distribution of visible light energy radiated in response to X-ray energy being shown by curve $a$ in FIG. 6. The photo-conductive particles 15' are formed of Cu- and Cl-activated CdS which effectively respond to light energy from the X-ray fluorescent particles 14', as well as to X-ray energy 23, its spectroscopic photo-conductive sensitivity being shown by curve $b$ in FIG. 6. As is obvious from FIG. 6, As is obvious from FIG. 6, the spectroscopic characteristics of particles 14' and 15' overlap each other substantially completely, and it is clear that the photo-conductive particles 15' effectively respond to and are excited by the converted light energy from the fluorescent particles 14'. As the boding material 16, epoxy resin is used which has a suitably high specific resistance and a high transparency to X-ray and visible light energies.

In the above-described composite element 100, since the photo-conductive particles 15' as the energy-sensitive elementary material and the bonding material 16 are both transparent to the input X-ray energy, the X-ray fluorescent particles 14' distributed in mixture as the energy-converting elementary material are effectively excited by the X-ray energy 23 even in the deep portion of the composite element 100, and radiate the converted light energy 4$\pi$ solid angle. Around a fluorescent particle $14_2$, the photo-conductive particles 15' exist surrounding the fluorescent particle 14' in 4$\pi$ solid angle, and consequently, the light energy is wholly absorbed by the photo-conductive particles 15'. This indicates that the utilizable solid angle of light energy radiated from the fluorescent particle 14' is 4$\pi$, and that the incident solid angle to the photo-conductive particle 15' to excite the same may be 2$\pi$ to 4$\pi$ according to the volume proportion of materials 14' and 15' used.

Particle size (diameter) of conventional photo-conductive powder 15' is 20$\mu$ or so, and consequently, the photo-conductive particles are excited to respond to the light energy deep into the inner portions thereof, notwithstanding the aforementioned lowering of sensitivity due to absorption of light energy. This excitation results throughout the whole composite element 100 with nearly 100% efficiency of the converted energy. Thus it will be appreciated that the composite structure is extremely sensitive and efficient.

It is to be noted that, even in the case of composite elements as shown in FIGS. 1 and 4, in which the elementary powder materials do not respond to X-ray energy, if the spectroscopic characteristics of the elementary materials overlap each other to a certain extent, they may be utilized as highly sensitive composite photo-conductive elements for X-ray use within the limits of overlapping. However, the embodiment shown in FIG. 5 provides a far more highly sensitive composite photo-conductive element with extremely simple construction, as can be seen from FIG. 5.

Referring again to FIG. 5, a pair of electrodes 43 and 44 are supplied auxiliary electric energy from an electrical source 73 through conductors 63 and 64. Thus, although the aforementioned behaviour is seen in the inner portion of composite element 100, in the surface portion of the same, light energy radiates to escape out of the composite element 100, resulting in loss of light energy as a whole and lowering of the utilizable solid angle. As a result, the sensitivity to excitation of photo-conductive particles in the surface portion of element 100 is lowered, and their photo-conductivity is low in comparison to those in the inner portion of element 100.

In order to obviate the above-mentioned default, the electrode 43 is made of Al (aluminum) plate which reflects light energy efficiently, besides serving as a support for the device. On the other hand, the electrode 44 is formed by Al film made of a vaporization-deposition process, which reflects light energy efficiently but is transparent to X-ray energy. Thus, the converted light energy is reflected towards the inner portion of element 100, and the radiation escape of light energy is prevented, whereby the utilization factor of the light energy as a whole is raised, and also the afore-mentioned lowering of photo-conductivity in the surface portion of element 100 is improved.

In the external circuit of electrical source 73, a signal-detecting element 90 is connected in series therewith in the form of a current meter for detecting photo-electric current produced by virtue of conductivity change of the composite element 100 due to a change in X-ray energy 23.

The above-described composite elements 100 were subjected to experiments. In order to secure sufficient contact of photo-conductive particles 15' with each other, the volume ratio of bonding material 16 to composite element 100 was made 20% and constant, the remaining 80% being occupied by photo-conductive particles 15' and X-ray fluorescent particles 14'.

The effective surface areas of electrodes were 3 x 5 cm.² and constant, the thickness of each composite element 100 was 250–300$\mu$, the strength of the electric field applied to the same was 20 v./100$\mu$ and constant, X-ray tube voltage (source of X-ray energy 23) was 80 kv. with tungsten target, and the gross quantity factor of input X-ray was 3.3 $\gamma$/min. and constant. The results of experiments are shown in FIG. 7, in which the abscissa scales substituted volume ratio ($\delta L$) obtained by substituting a portion of the volume occupied by photo-conductive elementary material 15' with X-ray fluorescent elementary material 14', taking 80% volume proportion of both materials 14' and 15' as 100%. For example, at $\delta L=0\%$, there is contained no X-ray fluorescent material, and only the photo-conductive material exists as in the case of conventional construction. At 20% $\delta L$, the composite element 100 excluding bonding material is consisting of 20% X-ray fluorescent material 14' and 80% photo-conductive material 15'. The ordinate scales $I_{px}/I_{po}$, where $I_{po}$ is the photo-electric current when $\delta L=0\%$, and $I_{px}$ is that when $\delta L=x\%$.

As is clear from FIG. 7, if $\delta L$ is increased above 0%, the light energy produced from unit volume of X-ray fluorescent particles 14' increases and in addition the input energy and the respondence thereto of photo-conductive particles 15' are increased to be excited further, showing larger-than-1% rate of sensitization, $I_{px}/I_{po}$. At $\delta L=12$–15%, $I_{px}/I_{po}$ is larger than 10. The curve also shows that too large an increase of $\delta L$ results in a lowering of rate of sensitization. This is due to the fact that the X-ray fluorescent material 14' is of relatively high specific resistance, and its too large an increase results in insulational isolation of the photo-conductive particles 15' to decrease the photo-electric current $I_p$, in spite of increased excitation of particles 15' by light energy. At $\delta L=100\%$, there exist X-ray fluorescent and bonding materials only, and $I_{px}/I_{po}=0$, and it is seen from FIG. 7 that the range of $I_{px}/I_{po}>1$ is for $\delta L$ lower than 26%. Needless to say, such a useful range is variable according to the natures and characteristics of the elementary materials used as well as the input energy and its strength, etc.

For example, when the composite elements of the above-mentioned experiments were subjected to 40 kv. X-ray energy, $I_{px}/I_{po}$ was about 200 at $\delta \pi$ of about 15%, and the range of $I_{px}/I_{po}$ larger than 1 was for $\delta L<40\%$. $I_{px}/I_{po}=200$ shows that the sensitivity of composite elements 100 is 200 times that of conventional element in which $\delta L=0\%$. Thus, it is seen that the present invention can accomplish a superior and tremendous advance in the art, particularly in view of the fact that it has been very difficult to increase the sensitivity of conventional elements solely by selection of or improvement in materials.

In the above description, while photo-electric currents $I_p$ are compared to each other by absolute values, the specific resistance of powder 14' is far higher than the darkness resistance of powder 15', and consequently darkness current $I_d$ decreases with increase of $\delta L$. Needless to say, therefore, the rate of signal change with respect to input energy, $I_p/I_d$, is large in comparison to that in conventional device, in the range of $\delta L$ in which $I_{px}/I_{po}$ is larger than 1.

In FIG. 8 is shown another embodiment of the invention, in which input X-ray energy is converted into visible light signal energy, such as for use in strengthened display of visible image convertion of X-ray or $\gamma$-ray image.

X-ray photo-conductive composite element 100, similar to that shown in FIG. 5, has about a 200 to 300$\mu$ thickness, and is associated at one side with a plate electrode 44 reflective to light energy and transparent to X-ray energy, which may be formed by aluminum vapor deposition as explained with reference to FIG. 5. The other side of composite element 100 is covered by a light-reflective layer 83 which is formed of a powdered material of high dielectric constant, such as $TiO_2$, $BaTiO_3$, etc., is secured by means of a bonding agent, such as epoxy resin, is white coloured and light-reflective, and yet allows effective application of voltage to the hereinafter-described electroluminescent layer 111, for the purpose of improving the lowering of respondency (photo-conductivity) in the surface portion of composite layer 100 by virtue of an opaque layer 113, to be described, which absorbs the converted visible light energy. The thickness of layer 83 is about 10 to 20$\mu$. Below the layer 113, an electro-luminescent layer 111 is provided for converting the electric-energy into a visible-light energy change, and composed of electroluminescent powder, such as ZnS:Cu, Al, and a bonding agent, such as epoxy resin, and is moulded into a layer form with a thickness of about 30 to 40$\mu$. Between the layers 113 and 111, a light-reflective insulating layer 112 is interposed for insulation purpose and for reflecting visible light energy from the layer 111 to improve the lightness of output visible image 24. The layer 112 is formed similarly to the layer 83. The afore-mentioned opaque layer 113 is made of black paint or the like with a thickness of about 5 to 10$\mu$, for preventing unstable operation due to feed-back of light energy from the layer 111 to the composite element layer 100. Below the layer 111 is disposed the other electrode 45 formed of transparent metal oxide, such as tin oxide. The whole structure is mounted on a transparent-glass supporter plate 110. The electrodes 44 and 45 are connected across an A.C. electric source 74, and supplied therefrom with auxiliary electric energy. The input energy 23 is X-ray energy, while the required signal or converted energy of composite element 100 is impedance change and electrical-energy control of the composite element, and the device of FIG. 8 is designed for controlling the visible light energy from the layer 111 by the above-mentioned signal or converted energy.

When a suitably adjusted A.C. voltage of the source 74 is applied across the electrodes 44 and 45 through conductors 65 and 66, and the X-ray image 23 is applied to the composite element layer 100, the impedance of layer 100 decreases in accordance with the local strength of the X-ray image, and as a function thereof, the applied voltage of electro-luminescent layer 111 is increased to provide the visible image 24 which has been converted and strengthened by the device. Since the rate of sensitization of the composite element layer 100 is about 10 to 200 times, as afore-mentioned, if the input X-ray energy and the output visible light energy change in a proportional relation to each other, the amplification factor of the X-ray-image converting and strengthening display device hereindescribed is about 10 to 200 times that of conventional photo-conductive layers wherein $\delta L=0$. If, again, the change in output visible light energy against input X-ray energy 23 is proportional to the square, the amplification factor is greatly improved to 100 to 40000 times.

As the light reflective layer 83, an energy-converting auxiliary element may be used, which generates converted energy in response to the input energy, and in which the converted energy excites the energy-sensible elementary material in the energy-sensible composite element. In such a case, if a sensitivity higher than that due to the amount of escape of converted energy out of the energy-sensible composite element is imparted to the energy-sensible elementary material by the energy-converting auxiliary element, the lowering of sensitivity of the surface portion due to the outward-escape effect is greatly improved, and in addition, a sensitization effect higher than that in the inner portion of the composite element can also be obtained. For example, the layer may be formed by or may contain X-ray fluorescent material for generating light energy, which overlaps the photo-conductive powder 15' in spectroscopic distribution, as described in connection with FIG. 5. Thus, the layer may be formed of (Zn·Cd)S₂:Ag powder, for example, same as the X-ray fluorescent powder 14', and epoxy resin as bonding agent, with a thickness of about 50μ.

With the above construction, the composite element 100 responds to the input X-ray energy passing therethrough to radiate the converted light energy, causing the surface portion of composite element 100 to respond thereto. In this case, good reflectivity is obtained advantageously for the light energy escaping by radiation from the X-ray fluorescent particles in the composite element 100. In general, escaping of signal or converted energy out of the energy-sensitive composite element in any of the embodiments can be improved by provision of light-reflective layer 83, but complete improvement cannot be accomplished because of losses due to inevitable absorption effect of converted energy, and so on, existing in the provisions.

However, if the portion of light-reflective layer is constructed as described below, the effect of above-mentioned losses is greatly improved, and an even further benefit can be obtained. Thus, instead of disposing the energy-converting auxiliary element 83 in direct contact with the composite element 100, a plastic layer is interposed between the two elements 83 and 100, which is transparent to the converted energy, say light energy.

In the above-described embodiments, both the energy-sensitive elementary material and the energy-converting elementary material are in powdered forms, and constitute a unity composite element by aid of bonding agent, but a bonding agent is not always required. Thus, if one of the elementary materials has bonding power also, a separate bonding agent is not required. For example, in FIG. 5, the photo-conductive material may be in the form of sintered layer in which X-ray fluorescent particles are commingled, or vice versa. Alternatively, the photo-conductive material and the X-ray fluorescent material may be simultaneously vaporized to deposit a composite film layer.

The energy-sensitive elementary material, energy-converting elementary material, and/or bonding material need not necessarily be solid, but need be in gaseous or liquid state. But whatever their composition, the fundamental idea of the present invention can be carried into practice by structure having the aforementioned relationships.

I claim:

1. A radiant energy sensitive element comprising commingled particles of luminescent and photo-conductive materials, said luminescent material being responsive to an input radiation of high quantum energy, converting said input radiant energy to another radiant energy and emitting said converted energy, said photo-conductive material at least partly transmitting the input energy and being responsive to both said converted and said input energy to thereby obtain an output.

2. A radiant energy sensitive element according to claim 1 wherein said input radiation of high quantum energy is γ-ray.

3. A radiant energy sensitive element according to claim 1 wherein said input radiation of high quantum energy is γ-ray.

4. A radiant energy sensitive element according to claim 1 wherein said luminescent material is not more than 40% by volume.

5. A radiant energy sensitive element according to claim 1 wherein the resistivity of said luminescent material is larger than that of said photo-conductive material in the dark state.

6. A radiant energy sensitive element according to claim 1 further comprising an electroluminescent element and a voltage source, the luminescence of said electroluminescent element being electrically controlled by the variation in the impedance of said radiation energy sensitive element responsive to input radiation.

7. A radiant energy sensitive element according to claim 1 wherein the luminescent material is fluorescent.

8. A radiant energy sensitive element according to claim 1 further comprising means for applying an external voltage across said element.

9. A radiant energy sensitive element according to claim 8 wherein said external means comprises an alternating voltage generator.

10. A radiant energy sensitive element according to claim 8 wherein said means for applying an external voltage comprises a pair of conductive plates between which the element is disposed, one of said plates being transparent to the input radiant energy and the other of said plates being reflective to the input energy, and the element itself being substantially transparent to the radiant energy.

11. A radiant energy sensitive element according to claim 10 wherein said means for applying an external voltage is electrically connected to the element so that the element has an output of radiant energy.

12. A radiant energy sensitive element according to claim 1 wherein additional means are provided at the outside of the element for retaining the converted energy of the luminescent material within the element.

13. A radiant energy sensitive element according to claim 1 further comprising an energy converting auxiliary element provided at the outside of the sensitive element for retaining radiant energy.

14. A radiant energy sensitive element according to claim 1 wherein both the luminescent and photoconductive materials are provided in powdered state and are bonded together by means of a binder to form a plate.

15. A radiant energy sensitive element according to claim 14 wherein the luminescent material is ZnCdS activated with silver and said photo-conductive material is selected from the group including CdS, CdSe, and a solid solution of CdS and CdSe activated with copper and chlorine.

16. A radiation energy sensitive element comprising a plate electrode reflective to light energy and transparent to radiations of high quantum energy, a layer comprising commingled particles of luminescent and photo-conductive materials, said layer being responsive to said radiations of high quantum energy and varying in its electrical impedance in response to said high quantum energy radiations, a light reflective layer of material of high dielectric constant, an opaque layer, a light reflecting insulating layer, an electroluminescent layer, and a transparent electrode, disposed in the above order, and an A.C. voltage source, whereby said high quantum energy radiations are converted into visible light signal energy.

References Cited

UNITED STATES PATENTS

| | | | |
|---|---|---|---|
| 2,880,346 | 3/1959 | Nicoll et al. | 250—71 X |
| 2,885,562 | 5/1959 | Marinace et al. | 250—71 X |

ARCHIE R. BORCHELT, Primary Examiner

A. B. CROFT, Assistant Examiner

U.S. Cl. X.R.

250—71.5, 83.3